(12) United States Patent
Toth et al.

(10) Patent No.: US 7,455,459 B2
(45) Date of Patent: Nov. 25, 2008

(54) OIL BATH ENCODER SEAL

(75) Inventors: David M Toth, Brighton, MI (US);
Gerald A Greca, Carleton, MI (US);
Michael J Anderson, Brighton, MI (US)

(73) Assignee: Federal Mogul World Wide, Inc., Southfield, MI (US)

( * ) Notice: Subject to any disclaimer, the term of this patent is extended or adjusted under 35 U.S.C. 154(b) by 281 days.

(21) Appl. No.: 11/371,405

(22) Filed: Mar. 9, 2006

(65) Prior Publication Data
US 2007/0211974 A1   Sep. 13, 2007

(51) Int. Cl.
*F16C 32/00* (2006.01)
*G01P 3/488* (2006.01)
(52) U.S. Cl. .................................. 384/448; 324/174
(58) Field of Classification Search ................ 384/448, 384/544; 324/174, 166, 173, 178, 179; 73/514.39
See application file for complete search history.

(56) References Cited

U.S. PATENT DOCUMENTS

| | | | | |
|---|---|---|---|---|
| 3,500,091 A | 3/1970 | Jones | ..................... | 310/168 |
| 4,161,120 A | 7/1979 | Cloarec | ..................... | 73/494 |
| 5,200,697 A * | 4/1993 | Adler et al. | ................. | 324/174 |
| 5,476,272 A | 12/1995 | Hixson, II | ................... | 277/152 |
| 5,570,013 A | 10/1996 | Polinsky et al. | ............. | 324/174 |
| 5,648,614 A | 7/1997 | Martsfeld et al. | ............ | 73/706 |
| 5,668,426 A | 9/1997 | Lamert et al. | ............... | 310/168 |
| 5,695,289 A | 12/1997 | Ouchi et al. | ................ | 384/448 |
| 5,863,124 A | 1/1999 | Ouchi et al. | ................ | 384/448 |
| 6,170,992 B1 * | 1/2001 | Angelo et al. | ............... | 384/477 |
| 6,186,667 B1 | 2/2001 | Nakamura et al. | .......... | 384/448 |
| 6,250,637 B1 | 6/2001 | Oricchio, Jr. | ................ | 277/321 |
| 6,328,476 B2 | 12/2001 | Nakamura et al. | .......... | 384/448 |
| 6,345,825 B1 | 2/2002 | Guth et al. | .................. | 277/317 |
| 6,573,705 B1 | 6/2003 | Tajima et al. | ............... | 324/174 |
| 6,637,754 B1 * | 10/2003 | Ohtsuki et al. | ............. | 384/448 |
| 6,729,623 B2 * | 5/2004 | Visconti | ..................... | 277/549 |
| 2001/0000713 A1 | 5/2001 | Nakamura et al. | .......... | 384/448 |
| 2002/0028032 A1 | 3/2002 | Norimatsu | .................. | 384/448 |
| 2004/0070151 A1 | 4/2004 | Klenk et al. | ................ | 277/391 |

* cited by examiner

*Primary Examiner*—Thomas R Hannon
(74) *Attorney, Agent, or Firm*—Robert L. Stearns; Dickinson Wright PLLC

(57) ABSTRACT

An oil lubricated rotating hub (14) and stationary spindle (12) assembly includes an oil bath seal (16, 16') for establishing a dynamic sealing interface between the hub (14) and spindle (12). A wheel sensor assembly includes a variable reluctance senor (54) targeted at an encoder ring (56, 56') which is integrated into the oil bath seal (16, 16'). The encoder ring (56, 56') is of the permanent magnet type including a plurality of magnetically polarized sectors alternating between North and South polarities. The use of an encoder style target (56, 56') in combination with a variable reluctance sensor (54) enables improved slow speed sensing with relatively large air gap spacing between the exposed (58, 58') of the encoder ring (56, 56') and the head of the VR sensor (54). Furthermore, the encoder ring (56, 56') enables use of less expensive, lighter materials for the oil bath seal carrier (20, 20').

24 Claims, 3 Drawing Sheets

OIL BATH ENCODER SEAL

BACKGROUND OF THE INVENTION

1. Field of the Invention

The subject invention relates generally to a vehicular wheel hub assembly including an integrated oil seal and speed sensor feature.

2. Related Art

Vehicle speed sensors integrated into a wheel assembly have many useful purposes. One common use for a speed sensor assembly is to cooperate with the vehicle anti-lock braking system. During a vehicle braking condition, a speed signal generated by pulsed electrical signals from the speed sensor assembly is sent to an on-board computer that responds to the drop in vehicle speed. If a wheel lock-up condition is anticipated, the computer directs a valve in the brake system to relieve or modulate the fluid pressure within the brake assemblies at the wheel thereby preventing an undesired wheel lock-up condition. When the computer determines that a lock-up condition is no longer imminent, the braking pressure is returned to normal operation.

In the case of larger trucks and commercial vehicles, it is common to incorporate a so-called oil bath seal between the rotating hub and its stationary spindle to keep lubricating fluid contained within the confines of the roller bearing assemblies. For such applications in which a vehicle speed sensor is desired, it has been taught to incorporate the target portion of the speed sensor assembly into the oil bath seal. In other words, the target for the speed sensor assembly is mounted to that part of the oil bath seal which rotates with the hub about the stationary spindle. The stationary portion of the sensing device, i.e., the sensor per se, is directed at the target in close proximity so that electrical pulses can be generated as the hub rotates, which electrical pulses are then converted into vehicle speed.

According to prior art techniques, speed sensor assemblies such as used in vehicle wheel systems fall into two general categories, namely variable reluctance and inductive type sensor systems. A variable reluctance sensor is a passive device which projects a magnetic field through a coil toward a ferrous target which serves as an actuator. As the actuator target moves, its discontinuities in the form of gear teeth, blades, etc., excite a voltage in the coil, thus producing an electrical sinusoidal wave current with frequency and voltage proportional to the target velocity. As each discontinuity passes by the pickoff coil, it generates a pulse and a pulse train as cycles are repeated. Variable reluctance type sensors are sometimes preferred for the comparatively large voltage amplitudes generated in operation.

Inductive sensors, while somewhat similar in configuration to the variable reluctance type and which generate the same type of signal, are nevertheless distinguished in that its inductive pickoff coils have no internal permanent magnet. Rather, an inductive sensor relies on external magnetic field fluxuations, such as a rotating permanent magnet in order to generate signal pulses. The rotating permanent magnet is often referred to as an encoder ring, and has never been used with the older-style VR sensor because the magnetic flux field produced by the encoder ring has been thought too weak to produce sufficient signal strength.

While both types of sensor assemblies have been proposed for use in vehicle wheel sensing applications, the large truck or commercial vehicle applications in which an oil bath seal is used in connection with a rotating hub and spindle assembly more typically make use of the variable reluctance (VR) type sensor configuration. The target for a VR system, which is also referred to as a tone ring, may be integrated with an oil bath seal. The tone ring is characterized by its thick, gear-like teeth or otherwise crenulated ring-like features. One example of a variable reluctance sensor for use in this type of application may be found in U.S. Pat. No. 5,476,272 to Hixon, grated Dec. 19, 1995 and assigned to the Assignee of this invention.

Because of the fundamental differences between the variable reluctance-type sensors and the inductive-type sensors, during maintenance operations when an oil bath seal is removed, it is required that its replacement include a tone ring style target for the variable reluctance sensor having the same number of teeth or crenulations as the part it is replacing. And while the tone ring style target designs have become somewhat disfavored because of their comparatively lower durability, thickness/weight and susceptibility to debris accumulation and corrosion, changing to an inductive type sensor would require the added expense and labor of also changing its inductive pickoff coil to the type used in an inductive-type sensor assembly. Accordingly, once a variable reluctance type sensor assembly is installed in a vehicle, subsequent maintenance operations continue to require an older style disfavored tone ring type target even though industry preferences are moving toward an inductive type sensor assembly.

SUMMARY OF THE INVENTION

The subject invention comprises an oil lubricated rotating hub and stationary spindle assembly comprising a spindle defining a rotary axis. A hub is supported on the spindle for rotation about the axis. An oil bath seal establishes a dynamic sealing interface between the hub and the spindle. The oil bath seal includes a metallic carrier fixed relative to the hub and a flexible sealing element extending from the carrier for establishing a fluid impervious seal during relative rotation between the hub and the spindle. An annular encoder ring is disposed on the carrier and is positioned concentrically about the axis. The encode ring has an exposed face comprising a plurality of magnetically polarized sectors alternating between North and South polarities. A variable reluctance sensor is disposed adjacent the encode ring for projecting a magnetic field toward the polarized sectors and producing a sinusoidal wave current in response to the movement of the polarized sectors therethrough. The sinusoidal wave current has a frequency which is proportional to the rotational velocity of the hub.

Accordingly, the subject invention advantageously makes use of an encoder ring style target which is used on inductive sensor type assemblies and has become more favorable in use due to its lower cost, compact size, lightweight and durability as compared with the prior art tone ring style targets. However, the sensor used with the subject encoder ring is a variable reluctance (VR) type sensor which, according to the prior art, has been used before only in connection with a thicker tone ring style target. Thus, the subject invention unites an encoder ring style target with a variable reluctance type sensor to produce the signal used to calculate vehicle speed. This novel approach allows service operators to replace old style tone ring type targets with the newer, preferred encoder style ring when the oil bath seal is replaced on the vehicle.

According to another aspect of the invention, an oil bath seal is provided of the type for establishing a dynamic sealing interface between a rotating hub and a stationary spindle. The oil bath seal comprises a metallic carrier including a carbon steel flange. A flexible sealing element is fixedly joined to the carrier for establishing a fluid impervious seal against an opposing surface, such as a wear sleeve or the spindle per se.

An annular encoder ring is fixed to the flange concentrically about the axis. The encoder ring has an exposed face comprising a plurality of magnetically polarized sectors alternating between North and South poles. A carbon steel flange includes a pilot feature for locating the encoder ring on the flange in a centered condition relative to the axis. Accordingly, the subject oil bath seal can be more rapidly produced, in that the pilot feature allows rapid locating and placement of the encoder ring on the flange in a perfectly centered condition.

According to yet another aspect of the invention, a method for replacing an oil bath seal includes the steps of providing a stationary spindle, providing a hub rotatably supported upon the spindle, providing a used oil bath seal in the interstitial space between the hub and the spindle, the used oil bath seal having an integrated tone ring style target for a variable reluctance sensor, removing the used oil bath seal, and installing a new oil bath seal in the interstitial space between the hub and spindle, the new oil bath seal having an encoder ring style target comprising a plurality of magnetically polarized sectors alternating between North and South polarity. According to the subject method, a new oil bath seal assembly having a preferred encoder ring style target is used as a replacement for an old style tone ring style target. The variable reluctance sensor unit associated with the old style tone ring can be reused even though the style of target has been changed to that which has, according to prior art teachings, been used only in connection with inductive type sensors.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
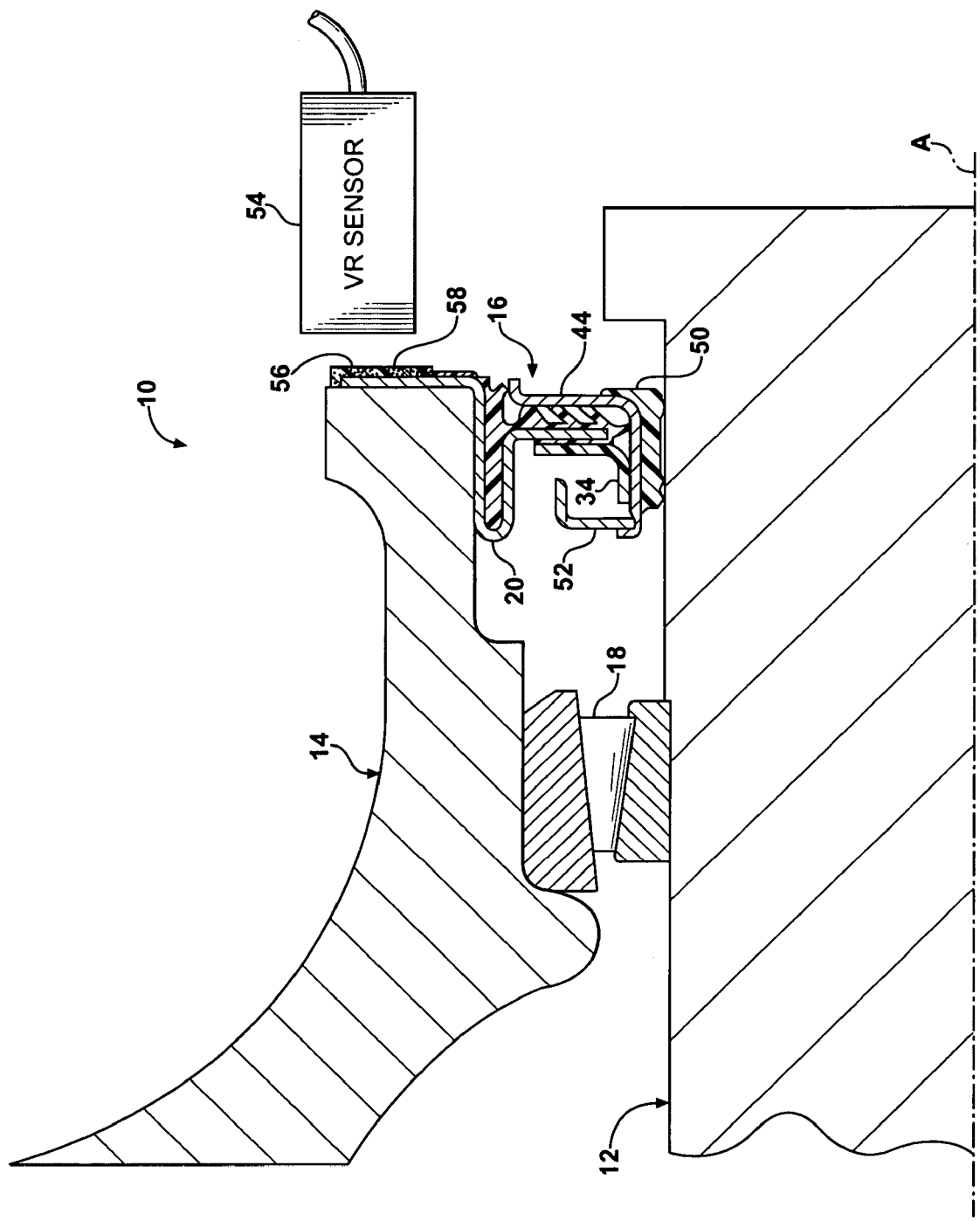
FIG. 1 is a simplified, fragmentary, cross-sectional view showing an oil lubricated rotating hub and stationary spindle assembly according to the subject invention.

Referring to the Figures, wherein like numerals indicate like or corresponding parts through the several views, a simplified cross-sectional view of an oil lubricated rotating hub and stationary spindle assembly is generally shown at 10. The assembly 10, which may be of a truck axle-wheel type, includes a stationary axle or spindle, generally indicated at 12, and a rotating wheel hub, generally indicated at 14. The hub 14 is supported on the spindle 12 for rotation about a central axis "A". In FIG. 1, only that half of the assembly 10 above the central axis "A" is depicted, it being understood that the lower half is a mirror image.

An oil bath seal, generally indicated at 16, establishes a dynamic sealing interface between the hub 14 and the spindle 12. In a typical arrangement, oil or other lubricating fluid will be contained in the interstitial space between the hub 14 and the spindle 12 on the left side of the oil bath seal 16 as view from FIG. 1, whereas the right hand side of the oil bath seal 16 will be exposed to ambient air. A tapered roller bearing assembly 18 provides the rotational support for the hub 14 upon the spindle 12. The roller bearing assembly 18 is contained on the oil side of the oil bath seal 16, so that it receives continuous lubrication during operation. Additional taper roller bearing assemblies 18 may be provided for added stability and as may be specified.

Figure 2:
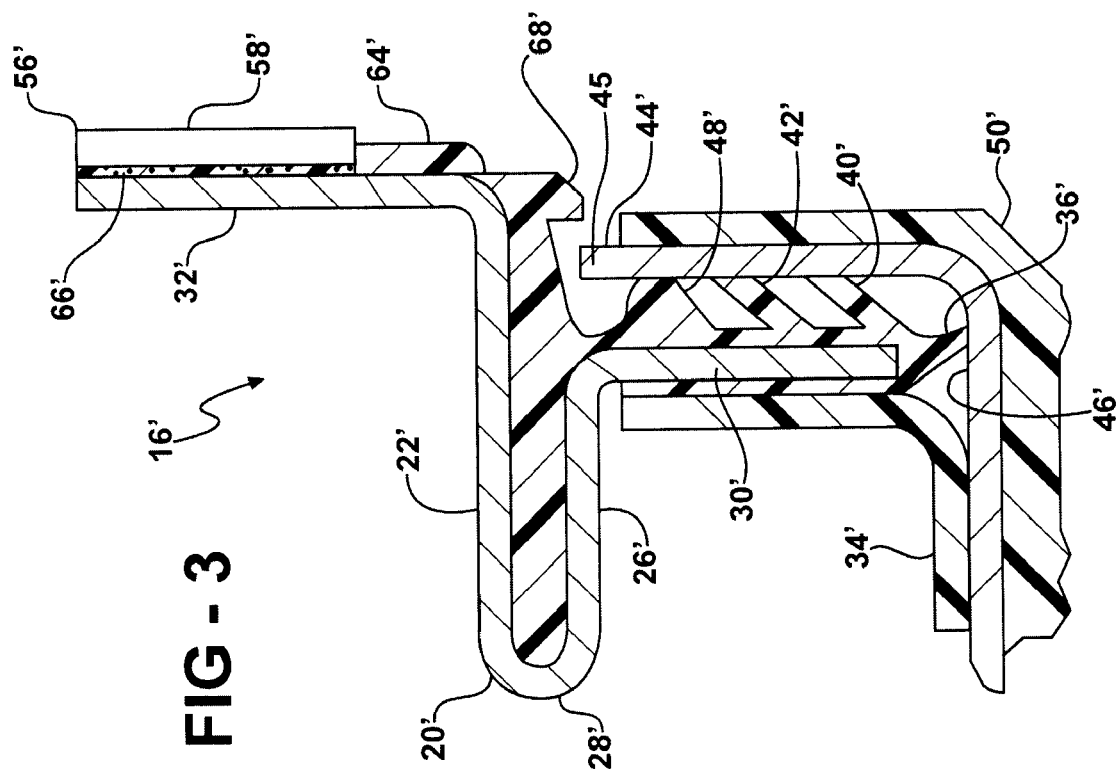
FIG. 2 is a cross-sectional view of the oil bath seal assembly according to the subject invention.

Referring now to FIG. 2, the oil bath seal 16 is shown in greater detail including a formed metal case or carrier 20 preferably fabricated from a carbon steel material. The carrier 20 is fixed relative to the hub 14 so that it rotates with the hub about the spindle 12 and its axis "A". This fixation is accomplished by press fitting a cylindrical outer wall section 22 of the carrier 20 within a correspondingly shaped female feature of the hub 14. A flow-on-gasket 24 can be applied to the outer wall 22 to perfect a fluid tight seal and improve retention within the hub 14. A cylindrical inner wall 26 is integrally connected to the outer wall 22 through an elbow feature 28. The carrier 20 further includes a radially extending shelf 30 extending from the inner wall 26. Opposite the shelf 30, extending radially outwardly from the outer wall 22, is a flange 32.

The oil bath seal 16 further includes a flexible sealing element extending from the carrier 12 for establishing a fluid impervious seal during relative rotation between the hub 14 and the spindle 12. The flexible sealing element can take many forms. In FIG. 2, the flexible sealing element is depicted as a bonded polytetrafluoroethylene (PTFE) type seal 34 which is bonded to the shelf 30. These well-known hydrodynamic style seals 34 provide long service life in oil bath seal applications. In additional to the bonded PTFE seal 34, the flexible sealing element may also include an inner radial dust lip 36, and outer radial dust lip 38, a first radial extending axial dust lip 40 and a second radial extending axial dust lip 42. All of these dust lip seals 36-42 contribute to the dynamic sealing interface so as to maintain a clean separation between the oil inside the rotating hub 14 and the air outside. Preferably, the dust lips 36-42 are formed simultaneously with the operation of bonding the PTFE seal 34 to the shelf 30 in an over-molding operation. Thus, the particular elastomeric formula used to bond the PTFE seal 34 to the shelf 30 may be suitable to create the various dynamic dust lips 36-42, or in the alternative some intermediate bonding agent may be necessary to achieve a good adhesion for the PTFE seal 34.

The oil bath seal 16 of the preferred embodiment also includes a wear sleeve 44 which is nested with the carrier 20. The wear sleeve 44 is provided with an annular running surface 46 concentrically disposed about the axis "A". The various seal and lip features of the sealing element are held in dynamic engagement with the running surface 46 during rotation of the hub 14. As shown in FIG. 2, the running surface 46 is contoured to provide both radial and axial engagement surfaces against which the PTFE seal 34 and the dust lips 36-42 engage, thereby creating a barrier for oil migration to the air side of the oil bath seal 16 as well as against dust infiltration from the air side. An axial thrust pad 48 may be formed simultaneously with the over-molding operation on the carrier 20 to provide a spaced bumper against which the running surface 46 engages, thereby preventing over-compression of the axial dust lips 40-42 and misalignment of all the sealing element features with respect to the wear sleeve 44. The internal diameter of the wear sleeve 44 can be overmolded with an elastomer formation 50 to perfect a fluid impervious, tight-fitting engagement with the stationary spindle 12.

The wear sleeve 44 is an optional feature, however as some applications for an oil bath seal may employ integral features of the spindle 12 against which to establish sealing contact with the various flexible sealing elements. In the example depicted in FIGS. 1 and 2, however, the oil bath seal 16 is provided with an integral wear sleeve 44 which is preferably of the unitized variety, meaning that the wear sleeve 44 is permanently joined to the oil bath seal 16. This unitizing effect is accomplished by a keeper 52 which prevents separation of the wear sleeve 44 from the carrier 20. The keeper 52, in this embodiment, comprises an L-shaped ring crimped in position to the oil side of the wear sleeve 44 after the carrier 20 has been properly seated on the running surface 46.

The subject oil bath seal 16 is configured to cooperate with a wheel speed sensor assembly, such as may be used for sensing or detecting the wheel speed. Referring again to FIG. 1, the wheel speed sensor assembly is shown including a stationary sensor 54 of the variable reluctance (VR) type. The VR sensor 54 is affixed in any known fashion to a non-illustrated mounting structure carried by the spindle 12, which results in a stationary mounting of the VR sensor 54. The VR sensor 54 is of the typical strain-based variety which projects a magnetic field through an internal coil. An alternating voltage is generated in the coil through fluxuations in the magnetic field.

In prior art configurations, the teeth of a tone-ring type target excite a voltage in the coil, thus producing an electrical sinusoidal wave current. However, in the subject invention, the more traditional tone ring type target is substituted with an encoder ring 56 such as found only in inductive sensor systems. The encoder ring 56 is an annular member disposed on the carrier 20 and positioned concentrically about the axis "A". Concentricity is assured through use of an appropriate piloting feature, such as an outer lip overhanging the edge of the carrier flange 32, or by extension of the elastomeric overmold material up to the inside diameter of the encoder ring 56. The encoder ring 56 has an exposed face 58 comprising a plurality of magnetically polarized sectors alternating between North and South polarities. The VR sensor 54 is positioned proximate the exposed face 58 of the encoder ring 56 and projects its magnetic field toward the polarized sectors so as to produce a sinusoidal wave current in response to movement of the polarized sectors through the magnetic field. The sinusoidal wave current will have a frequency which is proportional to the rotational velocity of the hub 14.

Figure 4:
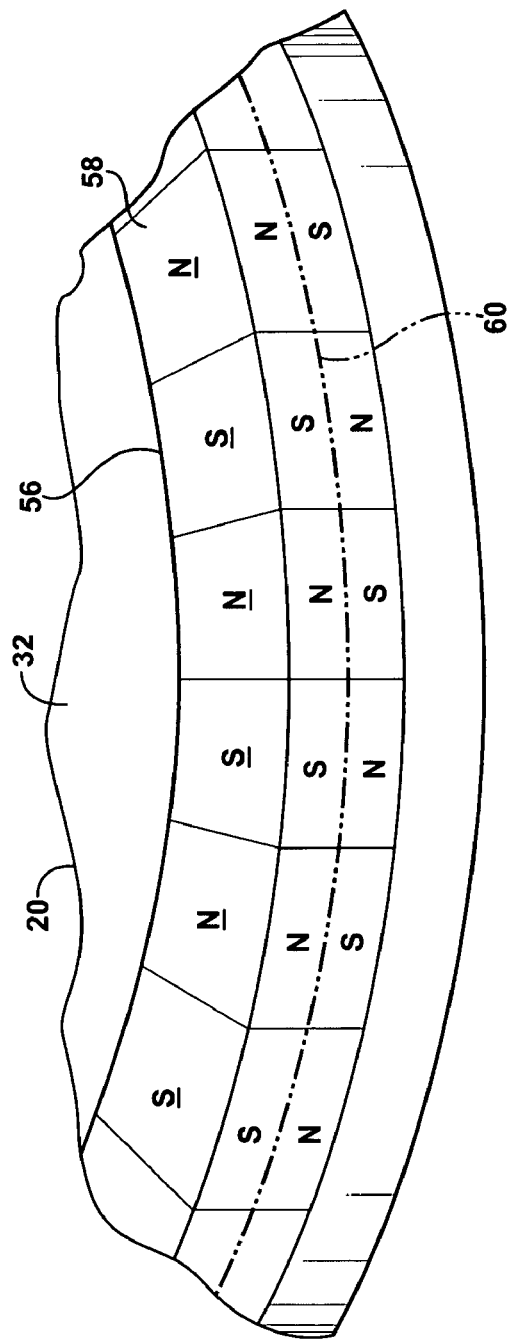
FIG. 4 is a fragmentary perspective view depicting the magnetically polarized sectors which constitute the subject encoder ring, as disposed on the carbon steel flange of the carrier.

The polarized sectors are perhaps best illustrated in FIG. 4 and are formed by a continuous annular strip of permanent magnets disposed on the flange 32 in full surface-to-surface contact. The encoder ring 56 can overlie the outer-most edge of the flange 32 as shown in FIG. 2, or not as shown in FIG. 4. Preferably, although not necessarily, the encoder ring 56 is of the elastomer based ceramic magnetic type whose general composition is known from gasketing and other sheet type applications of such magnets. Alternatively, the encoder ring 56 can be formed in an over-molding operation with the magnetic qualities imparted in a subsequent magnetizing operation. About the circumference of the flange 32, the encoder ring 56 may be divided into any number of polarized sectors provided the number of such sector is even and their arcuate dimension is substantially equal. Each sector presents a North or South polarization on the exposed face 58 which is different from that of the adjacent sectors, such that the exposed face 58 alternates in North-South increments regularly about its circumferential measure. The axial thickness of the encoder ring 56 may be distinguished by a median line 60 which, although not visible, represents a polarity reversal within each sector toward the back side of the encoder ring 56.

Because the magnetic strength of such encoder rings 56 are fairly weak, the amount of fluxuation in the magnetic field produced by the VR sensor 54 would typically be too weak to detect. However, because the flange 32 is composed of a carbon steel material and backs the encoder ring 56 in full surface-to-surface contact, the magnetic field strength produced by the encoder ring 56, looping between adjacent poles or sectors, is substantially enhanced to the point where the VR sensor 54 is capable of detecting and being influenced by the magnetic discontinuities. Thus, an electrical sinusoidal wave current is produced through the magnetically enhanced fields of the encoder ring 56, resulting from the full surface-to-surface backing by the carbon steel flange 32. Accordingly, a gain in the flux amplitude of the encoder ring 56 is achieved when it is backed by the carbon steel flange 32.

Figure 5:
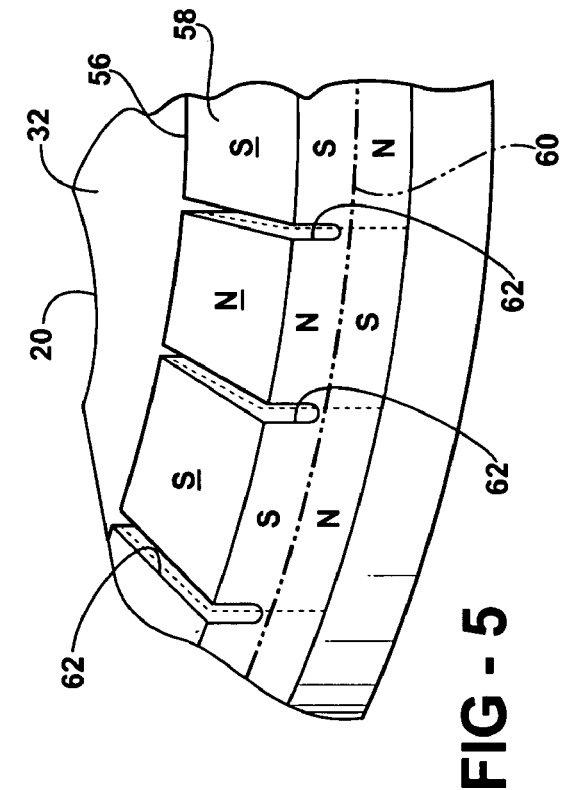
FIG. 5 is a fragmentary perspective view as in FIG. 4 but showing an alternative embodiment of the invention wherein grooves are formed between adjacent polarized sectors.

FIG. 5 illustrates an alternative embodiment of the subject encoder ring 56 which including a plurality of radial grooves 62 disposed in the exposed face 58. One groove 62 is associated with each of the polarized sectors, and extends radially along the line of separation between adjacent polarized sectors. The depth of the grooves 62 may be varied to suit a particular application, but in the preferred embodiment they will have an axial depth measured from the exposed face 58 less than or equal to ⅔ of the axial thickness of the encoder ring 56. The grooves 62 have an affect of accentuating the magnetic field created by the encoder ring 56 so as to sharpen the wave form of electrical sinusoidal wave current produced when the hub 14 is rotated. Thus, it is possible that more accurate pulses can be generated for use in the vehicle wheel speed sensor system.

Figure 6:
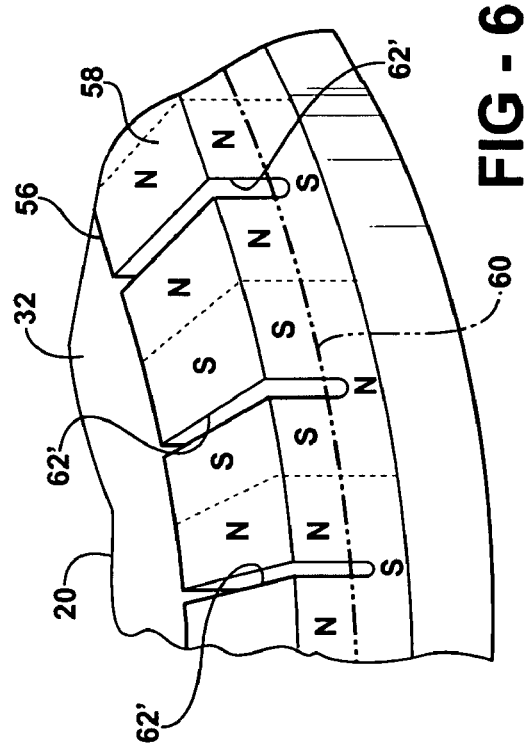
FIG. 6 is a fragmentary perspective view as in FIG. 5 but showing yet another alternative configuration where the grooves are formed centrally within each magnetically polarized sector.

In FIG. 6, an alternative embodiment of the grooves 62' is depicted. In this case, the grooves 62' are again radially disposed through the exposed face 58, but instead of being placed along the line of separation between adjacent polarized sectors, each groove 62' is disposed centrally within each polarized sector, thereby dividing its polarized face into two half sectors. Like the boundary line grooves 62 shown in FIG. 5, the sector-bisecting grooves 62' accentuate the magnetic field created by the encoder ring 56 and thereby improve the sensing quality.

Figure 3:
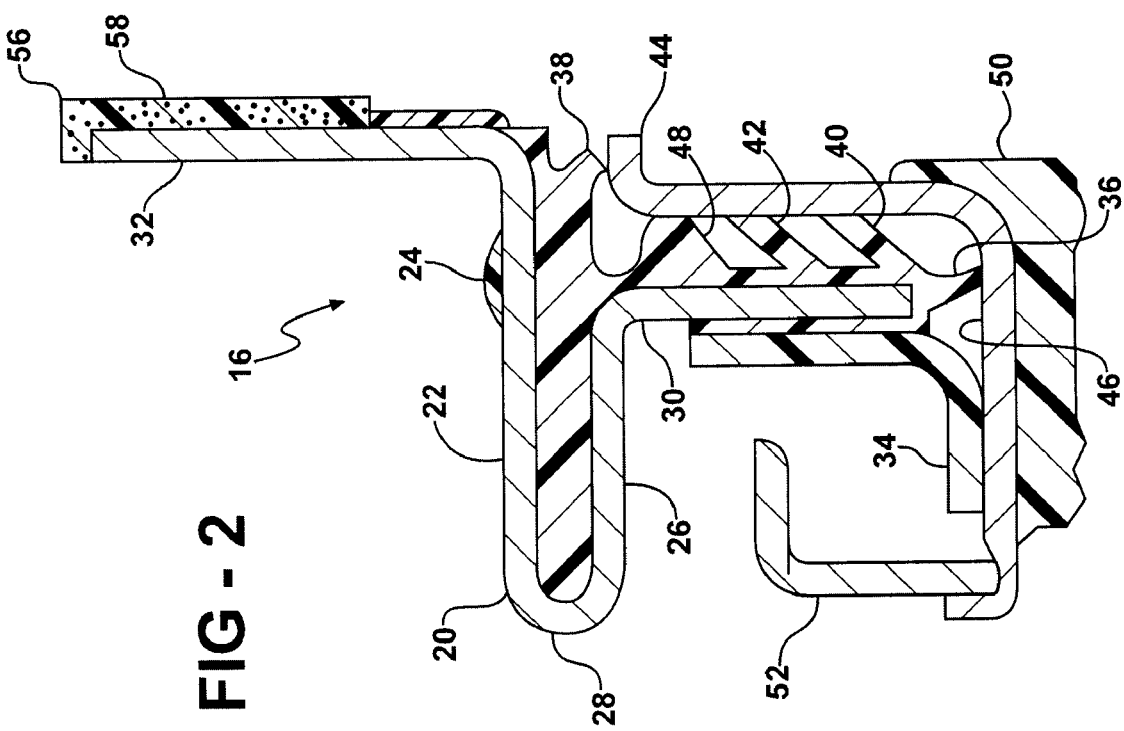
FIG. 3 is a cross-sectional view of an alternative configuration for the subject oil bath seal assembly.

In FIG. 3, an alternative configuration for the subject oil bath seal is generally indicated at 16'. In connection with FIG. 3, the prime designation is used to identify features identical to or readily corresponding with those described above in connection with the other figures. Thus, the oil bath seal 16' of FIG. 3 includes a carrier 20' having a flange 32' upon which an encoder ring 56' is attached by bonding. In this example, the encoder ring 56' does not include the overhanging outer lip feature depicted in FIG. 2. Rather, the location of the encoder ring 56' is accomplished by a pilot 64' formed on the flange 32'. The pilot 64' can be a separate feature or integrally molded with the dust lips 36'-42'. In lieu of the overhanging outer lip, the pilot 64' serves as the sole centering feature, having an outer edge which corresponds to the inner diameter of the encoder ring 56', so that it can be readily placed on and bonded to the flange 32'. For this purpose, an adhesive 66' can be used to achieve satisfactory bonding. The adhesive 66' may, for example, comprise a 0.005-0.025 inch thick elastomeric film, which may or may not be pre-magnetized. In fact, the adhesive 66' may be intentionally non-magnetic. In this alternative embodiment, a soft unitizing configuration is achieved by use of a non-contacting retention lip 68' which overhangs an upstanding part or radially outwardly projecting end flange 45 of the wear sleeve 44'. The soft flexible unitizing retention lip 68' functions as the keeper in this embodiment by capturing the end flange 45 which is pushed past the lip 68' as illustrated in FIG. 3, thereby eliminating the rigid formation shown in FIG. 2.

It will be appreciated that the various alternative configurations shown in FIGS. 3, 5 and 6 can be interchanged with one another and with features shown in the preferred embodiment of FIGS. 2 and 4. Furthermore, other types of sealing arrangements and formations of the carrier 20 and wear sleeve 44 are possible, depending largely upon the intended application.

A particular advantage of an encoder ring style target for the VR sensor 54 can be seen in FIGS. 2 and 3, wherein the air side of the oil bath seal 16, 16' is substantially encased in corrosion resistant material. This fact is enhanced by use of the pilot feature 64, 64' which, by virtue of the over-molded elastomer, provides substantial sealing integrity and protection for the exposed carbon steel component. Furthermore, because an encoder ring 56, 56' can be made substantially thinner than a prior art tone ring which demanded discernable discontinuities such a gear teeth or crenulations, the carrier 20, 20' can be made from substantially thinner and less costly material. Thus, by protecting the exposed surfaces on the air side of the carrier 20, 20' with elastomeric over-molding and by the corrosion resistant encoder ring 56, thinner and less expensive sheet metal can be used to form the carrier 20, without the need for corrosion resistant coating or paint. Another advantage of the subject encoder ring 56, 56' results from the permanent magnetic quality of this type of target. More particularly, the permanent magnet encoder ring 56, 56' will attract ferrite particles which may otherwise fall into the oil bath seal 16, 16' and degrade the flexible sealing element.

Another significant advantage of the subject invention which combines the encoder ring 56, 56' with a VR sensor 54 resides in its ability to demonstrate acceptable voltage signal performance at minimum wheel speeds, and at relatively large air gaps. For example, as depicted in the table below, testing conducted to compare the voltage output produced by a prior art tone ring in combination with its VR sensor was made against the subject encoder ring 56, 56' placed into service with the same VR sensor 54. The tests were conducted at wheel speeds of 30, 50 and 100 rpm, and each wheel speed was measured at air gaps (i.e., axial spacing between the VR sensor 54 and the exposed face 58, 58') of 0.01, 0.02 and 0.03 inches.

| Speed (rpm) | Air Gap (inches) | Tone Ring VR Sensor | Encoder Ring VR Sensor |
| --- | --- | --- | --- |
| 30 | 0.01 | 0.77 volts | 0.43 volts |
|  | 0.02 | 0.32 volts | 0.27 volts |
|  | 0.03 | 0.19 volts | 0.26 volts |
| 50 | 0.01 | 1.30 volts | 0.75 volts |
|  | 0.02 | 0.63 volts | 0.45 volts |
|  | 0.03 | 0.30 volts | 0.42 volts |
| 100 | 0.01 | 2.10 volts | 1.50 volts |
|  | 0.02 | 1.23 volts | 0.88 volts |
|  | 0.03 | 0.64 volts | 0.83 volts |

As shown above, while the peak voltage produced by the subject encoder ring 56, 56' is lower than that produced by a prior art tone ring at the lower air gap spacings, it is noteworthy that the subject encoder ring 56, 56' achieves less overall signal loss as the air the gap increases. Furthermore, the subject encoder ring 56, 56' maintains significantly higher voltage amplitudes at slower wheel speeds with the larger air gap, thereby enabling more accurate speed sensing at lower speeds.

Obviously, many modifications and variations of the present invention are possible in light of the above teachings. It is, therefore, to be understood that within the scope of the appended claims, the invention may be practiced otherwise than as specifically describe.

What is claimed is:

1. An oil lubricated rotating hub and stationary spindle assembly, said assembly comprising:
    a spindle defining a rotary axis;
    a hub supported on said spindle for rotation about said axis;
    an oil bath seal for establishing a dynamic sealing interface between said hub and said spindle, said oil bath seal including a metallic carrier fixed relative to said hub and a flexible sealing element extending from said carrier for establishing a fluid impervious seal during relative rotation between said hub and said spindle;
    an annular encoder ring disposed on said carrier and positioned concentrically about said axis, said encoder ring having an exposed face comprising a plurality of magnetically polarized sectors alternating between North and South polarity; and
    a variable reluctance sensor disposed adjacent said encoder ring for projecting a magnetic field toward said polarized sectors and producing a sinusoidal wave current in response to the movement of said polarized sectors therethrough, said sinusoidal wave current having a frequency proportional to the rotational velocity of said hub.

2. The assembly as set forth in claim 1 wherein said carrier includes a carbon steel flange, said encoder ring being disposed on said flange in full surface-to-surface contact therewith.

3. The assembly of claim 2 further including a pilot for locating the encoder ring in a centered condition relative to said axis on said flange.

4. The assembly of claim 1 wherein said carrier includes a carbon steel flange, said encoder ring bonded to said flange with an adhesive.

5. The assembly of claim 1 wherein a wear sleeve is nested relative to said carrier and has an annular running surface concentrically disposed about said axis; said sealing element held in dynamic engagement with said running surface during rotation of said hub.

6. The assembly of claim 5 further including a unitizing keeper for resisting separation of said wear sleeve from said carrier.

7. The assembly of claim 6 wherein said keeper extends rigidly from said wear sleeve.

8. The assembly of claim 6 wherein said keeper extends resiliently from said carrier.

9. The assembly of claim 1 wherein said carrier consists essentially of carbon steel.

10. The assembly of claim 9 wherein said encoder ring includes an even number of magnetically polarized sectors.

11. The assembly of claim 9 further including a plurality of grooves disposed in said face of said encoder ring, each of said grooves associated with one of said polarized sectors.

12. The assembly of claim 11 wherein said grooves extend radially relative to said axis.

13. The assembly of claim 11 wherein said grooves are disposed between adjacent polarized sectors.

14. The assembly of claim 11 wherein said grooves are disposed centrally within each of said polarized sectors.

15. The assembly of claim 11 wherein said encoder ring has an axial thickness, and wherein each of said grooves have an axial depth less than or equal to ⅔ of said axial thickness.

16. An oil bath seal configured to establish a dynamic sealing interface between a rotating hub and a stationary spindle, said seal comprising:
a metallic carrier including a carbon steel flange, wherein said carrier consists essentially of carbon steel;
a flexible sealing element fixedly joined to said carrier for establishing a fluid impervious seal against an opposing surface;
an annular encoder ring fixed to said flange concentrically about said axis, said encoder ring having an exposed face comprising a plurality of magnetically polarized sectors alternating between exposed North and South poles; and
said flange including a pilot for locating said encoder ring in a centered condition relative to said axis on said flange;
further including a plurality of grooves disposed in said face of said encoder ring, each of said grooves associated with one of said polarized sectors.

17. The assembly of claim 16 wherein said grooves extend radially relative to said axis.

18. The assembly of claim 16 wherein said grooves are disposed between adjacent polarized sectors.

19. The assembly of claim 16 wherein said grooves are disposed centrally within each of said polarized sectors.

20. The assembly of claim 16 wherein said encoder ring has an axial thickness, and wherein each of said grooves have an axial depth less than or equal to ⅔ of said axial thickness.

21. A method for replacing an oil bath seal, said method comprising the steps of:
providing a stationary spindle;
providing a hub rotatably supported upon the spindle;
removing a used oil bath seal from the interstitial space between the hub and the spindle, the used oil bath seal having an integrated tone ring target; and
installing a new oil bath seal in the interstitial space between the hub and spindle, the new oil bath seal having an encoder ring target comprising a plurality of magnetically polarized sectors alternating between North and South polarity.

22. A seal assembly comprising:
a carrier having a generally planar flange;
a primary seal element mounted on and extending radially inwardly of said carrier;
a wear sleeve separately formed and rotatable relative to said carrier and having a generally cylindrical outer sealing surface about which said primary seal engages, and an end flange of said wear sleeve projecting radially outwardly of said outer sealing surface; and
an elastically flexible non-metallic retention feature disposed on said carrier generally planar with said flange and projecting radially inwardly in radial overlapping relation to said end flange of said wear sleeve on a side of said flange axially opposite said primary seal element and operative to retain said flange of said wear sleeve against axial separation from said carrier in a direction toward said retention feature.

23. The assembly of claim 22 wherein said primary seal comprises a PTFE element bonded to said carrier by an elastomeric material and where said retention feature is made of the same elastomeric material as that used to bond said PTFE element to said carrier.

24. The assembly of claim 23 wherein said retention feature comprises a radial lip.

* * * * *